(12) United States Patent
Tsirkin

(10) Patent No.: US 11,023,238 B1
(45) Date of Patent: Jun. 1, 2021

(54) OPTIMIZED BRANCHING USING SAFE STATIC KEYS

(71) Applicant: RED HAT, INC., Raleigh, NC (US)

(72) Inventor: Michael Tsirkin, Lexington, MA (US)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 16/801,837

(22) Filed: Feb. 26, 2020

(51) Int. Cl.
*G06F 9/30* (2018.01)
*G06F 9/455* (2018.01)
*G06F 9/4401* (2018.01)

(52) U.S. Cl.
CPC ...... *G06F 9/30181* (2013.01); *G06F 9/30054* (2013.01); *G06F 9/30058* (2013.01); *G06F 9/45533* (2013.01); *G06F 9/4401* (2013.01)

(58) Field of Classification Search
None
See application file for complete search history.

(56) References Cited

PUBLICATIONS

Nadav Amit et al., "JumpSwitches: Restoring the Performance of Indirect Branches In the Era of Spectre", USENIX Association, 2019 USENIX Annual Technical Conference, https://www.usenix.org/conference/atc19/presentation/amit, 2019, pp. 285-299.
Ingo Molnar, "[PATCH] static keys: Introduce 'struct static_key', static_key_true()/false() and static_key_slow_[inc|dec]()", lkml.iu.edu/hypermail/linux/kernel/1202.3/00058.html, Feb. 24, 2012, 28 pgs.

*Primary Examiner* — Scott C Sun
(74) *Attorney, Agent, or Firm* — Lowenstein Sandler LLP

(57) ABSTRACT

Systems and methods for managing optimized branching in executable instructions are disclosed. In one implementation, a processing device may identify, in a sequence of executable instructions, a jump instruction associated with a safe static key. Responsive to determining that a condition is satisfied, the processing device may further replace the jump instruction with an optimized transfer of control instruction provided by one of: a no operation instruction or an unconditional jump instruction specifying a first jump target location. Responsive to determining that a rate of modification of the safe static key exceeds a threshold rate, the processing device may also replace the optimized transfer of control instruction with a conditional jump instruction specifying the first jump target location.

20 Claims, 8 Drawing Sheets

OPTIMIZED BRANCHING USING SAFE STATIC KEYS

TECHNICAL FIELD

The present disclosure is generally related to computer systems, and more particularly, to provide optimized branching using safe static keys.

BACKGROUND

Source code is a list of human-readable instructions that a programmer writes when developing software. Compilers are used to translate source code, which is a list of human-readable instructions that a programmer writes when developing software, into object code comprising a sequence of executable instructions. Code optimization may be a method of code modification to improve the quality and efficiency of the source code.

BRIEF DESCRIPTION OF THE DRAWINGS

The present disclosure is illustrated by way of examples, and not by way of limitation, and may be more fully understood with references to the following detailed description when considered in connection with the Figures, in which.

DETAILED DESCRIPTION

Figure 1:
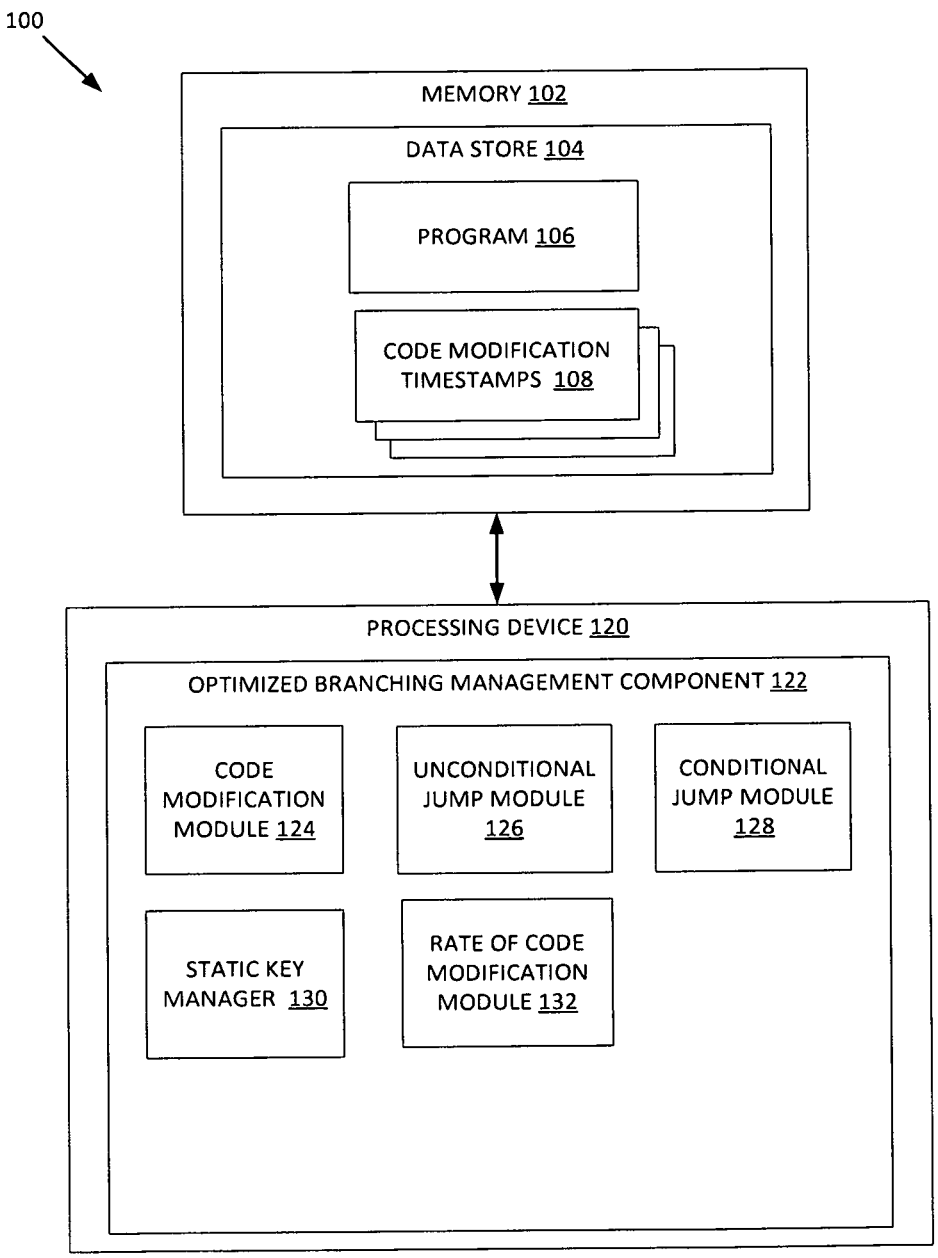
FIG. 1 is a block diagram that illustrates an embodiment of a host computer system, in accordance with one or more aspects of the present disclosure.

Described herein are methods and systems for providing optimized branching during the execution of a compiled program using a safe static key. A safe static key refers to a variable that is included by a conditional expression evaluated at run-time in order to determine the flow of execution of a sequence of executable instructions in the compiled program. In implementations, a conditional jump instruction that branches execution to a given location based on the value of the static key is replaced with an optimized transfer of control instruction (e.g., an unconditional jump instruction), based on the value of the static key. The replacement happens at run time after the value of the static key is initialized. Inserting the unconditional jump instructions at run time eliminates the need to evaluate the conditional expression before branching, thus resulting in a more rapid execution of the program.

On the other hand, the jump instruction may need to be modified in order to reflect eventual modifications of the value of the static key, e.g., to branch execution to a different location within the program. Frequent code modifications may result in overhead and may adversely impact the performance of the execution environment, particularly when executing performance-sensitive routines. Therefore, it is generally recommended to defer run time code modifications for a time when the processor is less busy. For example, Linux® has support for deferred static key updates. However, deferred static key updates are not always possible. For example, in some instances, updating static keys may be required to proper continue executing the program, rather than merely to provide an optimized path. In this case, deferring the update may not be feasible because it may result in halting the execution of the program. Additionally, before the value of the static key is initialized, a no operation instruction may be in place of the unconditional jump instruction until initialization completes. Therefore, during a booting sequence of a virtual machine for example, there may be a performance overhead because the execution of the program may halt due to the no-op instruction until initialization of the static key is complete.

Other conventional solutions may offer eliminating static key and run-time code modification in favor of using conditional jump instructions. While this approach may improve the performance of the boot process of a virtual machine, e.g., because the program no longer needs to wait for a static key to be initialized, execution time after the boot process is complete may be slow due to the evaluation of the condition of the conditional jump instruction replacing the unconditional jump instruction.

The present disclosure alleviates the above-noted and other deficiencies by enabling optimized branching using a safe static key. In accordance with one or more aspects of the present disclosure, branching within a sequence of executable instructions may be supported by a conditional jump instruction or an optimized transfer of control instruction (e.g., an unconditional jump instruction) based on a rate of code modifications caused by the optimized transfer of control instruction. In implementations, a safe static key may refer to a conditional expression that enables optimized branching. In an illustrative example, a static key may be defined in code as DEFINE_STATIC_KEY_TRUE (key), where the key is a global variable. In this case, a static key may be created and its value is initialized to TRUE. Optimized static branches can then be executed based on the value of the static key as follows:

if (static_branch_likely(&key))
        do likely code;
    else
        do unlikely code;

In an illustrative example, the compiled program may be executed by a process running on a virtual machine. During the boot process of the virtual machine, the optimized transfer of control instruction may be replaced with a conditional jump instruction to branch the execution sequence to a given target location upon satisfaction of a certain condition. While the conditional jump instruction may slow down the performance of execution due to the evaluation of the condition, the conditional jump instruction is safe to use during boot time until proper values for the safe static key has been populated based on the current configurations of the execution environment.

In this case, when the safe static key is initialized (e.g., after the boot process of the virtual machine is completed) a processing logic implementing the present disclosure may replace the conditional jump instruction with an optimized transfer of control instruction based on the value of the safe static key. For example, if the value of the safe static key satisfies a logical condition (e.g., is equal to a certain value, is less than a certain value, or exceeds a certain value), the conditional jump instruction may be replaced with an unconditional jump instruction to a given location within the sequence of instructions. On the other hand, if the value of the safe static key does not satisfy the logical condition, the conditional jump instruction may be replaced with a no operation (e.g., no-op) instruction, indicating that the execution may continue to the next instruction in the sequence without branching.

When the optimized transfer of control instruction is inserted in the code, code modifications may be further performed to change the flow of execution based on the value of the safe static key. For example, the processing logic may determine that if the value of the safe static key satisfies a predetermined logical condition (e.g., is greater than zero), then the optimized transfer of control instruction is an unconditional jump instruction to perform a first fragment of code. On the other hand, when the value of the safe static fails to satisfy the predetermined logical condition (e.g., is equal to or less than zero), the processing logic may update the optimized transfer of control instruction to the no-operation instruction, thus causing execution of to perform a second fragment of code. In implementations, the value of the safe static key can be changed (e.g., incremented or decrements) during the execution of the process running the sequence of instructions.

Because frequent code modifications can adversely impact performance, particularly when executing performance-sensitive system calls for example, the processing logic may monitor the rate of static key modifications and may replace the optimized transfer of control instruction with a conditional jump instruction when the rate of static key modification exceeds a threshold rate. In one implementation, in order to determine the rate of modification of the optimized transfer of control instruction, the processing logic may store a list of timestamps of the last N modifications of the static key, where N is a predetermined positive integer value. The processing logic may then determine, based on the list of timestamps, the number of code modifications that took place within a given unit of time from the current time, and determine if that rate exceeds a specific threshold rate. In implementations, the processing logic may execute a background thread to calculate the rate of code modifications periodically and to replace the optimized transfer of control instruction with the conditional jump instruction if the rate of code modifications exceed the threshold. In other implementations, the processing logic may calculate the rate of code modifications at the time of inserting a new modification timestamp in the list of code modifications timestamps. In an illustrative example, if the processing logic determines that more than ten modifications of the optimized transfer of control instruction took place within the last one second, then the optimized transfer of control instruction may be replaced with the conditional jump instruction until the rate of modifications drops below the threshold. In other implementations, the processing logic may monitor the rate of modifications of the static key in order to determine whether or not to replace the optimized transfer of control instruction with the conditional jump instruction.

In implementations, the processing logic may continue to monitor the last N times that modifications to the static key occurred in order to determine whether or not to replace the conditional jump instruction with the optimized transfer of control instruction, to enable optimization again. In one implementation, the processing logic may determine, based on the list of N timestamps, the number of static key modifications that took place within a given unit of time from the current time, and determine if that rate is below a second threshold rate. For example, if the number of static key modifications that occurred within the last second is less than seven, the processing logic may determine that the code modification rate is low enough and that optimization may be enables again. The processing logic may then replace the conditional jump instruction with the optimized transfer of control instruction. The processing logic may continue to monitor the rate of modification of the static key and may continue to switch between optimized branching and conditional branching based on the modification rate of the static key.

Thus, the systems and methods described herein represent improvements to the functionality of general purpose or specialized computing devices, by implementing efficient safe static key for optimized branching in instructions running on virtual machines as well as on physical computer systems. Providing a safe static key that allows for dynamically switching an optimized transfer of control instruction to a conditional jump instruction based on the rate of code modifications caused by the optimized transfer of control instruction enables an improved performance for system calls executing on the target machine because the rate of code modification may be maintained below a certain threshold. The safe static key further improves the booting time of a virtual machine executing the optimized transfer of control instruction because code modification may be turned off during the booting process of the virtual machine. The systems and methods described herein may be implemented by hardware (e.g., general purpose and/or specialized processing devices, and/or other devices and associated circuitry), software (e.g., instructions executable by a processing device), or a combination thereof. Various aspects of the above referenced methods and systems are described in details herein below by way of examples, rather than by way of limitation.

FIG. 1 is a block diagram of an example computing system 100 in which embodiments of the disclosure may operate. Computing system 100 may provide a production or a deployment environment and may enable a user to configure and deploy programs. Computing system 100 may be a single computing machine or multiple computing machines arranged in a homogeneous or heterogeneous group (e.g., cluster, grid, server farm). Computing system 100 may include one or more rack mounted servers, workstations, desktop computers, notebook computers, tablet computers, mobile phones, palm-sized computing devices, personal digital assistants (PDAs), etc. In one example, computing system 100 may be a computing device implemented with x86 hardware. In another example, computing system 100 may be a computing device implemented with PowerPC®, SPARC®, other hardware, or a combination thereof. In either example, computing system 100 may include one or more hardware resources. In yet another example, computing system 100 may run a virtual machine by executing a virtual machine manager, often referred to as "hypervisor," above the hardware and below the virtual machines.

Computing system 100 may include one or more physical or virtual central processing units (CPUs) 120 (referred to as "processor" or processing device") communicatively coupled to a memory device 102 (referred to as "memory"). Processing device 120 may also be communicatively coupled to a network interface controller (NIC) (not shown). Local components within computing system 100, including connections between processing device 120, memory device 102, and the NIC may be provided by one or more local buses (not shown) of suitable architecture.

Processing device 120 herein shall refer to a device capable of executing instructions encoding arithmetic, logical, or I/O operations. In an illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor, which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket).

"Memory device" herein shall refer to a volatile or non-volatile memory device, such as random access memory (RAM), read only memory (ROM), electrically erasable programmable read-only memory (EEPROM), or any other device capable of storing data. "Network interface controller" herein shall refer to a device capable of implementing a physical layer and data link layer standard (such as Ethernet or InfiniBand).

Memory 102 may include at least one memory component, or multiple memory components. Memory 102 may include a data store 104. Data store 104 may be referred to as a source code repository, a program repository, an image repository, a document repository, other repository, or a combination thereof. Data store 104 may include a single data storage device or multiple storage devices and may store data as one or more file system objects (e.g., files, directories), database objects (e.g., records), data blobs (e.g., continuous or non-continuous bit series), other data storage objects, or a combination thereof.

Data store 104 may store at least a program 106 that may include executable instructions comprising one or more optimized transfer of control instruction. Program 106 may further include a safe static key, the value of which may be updated at run time, thus resulting in further code modifications, as explained in more details herein below. Data store 104 may also store a list of code modification timestamps 108. In other implementations, code modification timestamps 108 may keep times of the most recent N number of modifications of the safe static key value.

Program 106 may refer to a binary file that may be generated by compiling one or more source code files. The binary file may be an executable program that contain a lower level language (e.g., assembly language, object code, or machine code). Program 106 may further include a sequence of executable instructions that may include one or more conditional jump instructions, one or more unconditional jumps instructions, one or more no-operation instructions (e.g., no-op) or a combination thereof. In some embodiments, program 106 may also include a safe static key field. The safe static key refers to a variable that is included by a conditional expression evaluated at run-time in order to determine the flow of execution of a sequence of executable instructions, as explained in more details herein.

Code modification timestamps may be stored in a fixed length list 108 for keeping timestamps of the most recent N number of static key modifications caused by the one or more optimized transfer of control instructions. In implementations, the processing logic may determine the rate of modification of the static key based on code modification timestamps 108 as the number of code modifications that took place within a given time window ending at the current time. The processing logic may then determine that the optimized transfer of control instruction generated at run-time by evaluating the static key may be replaced with a conditional jump instruction if the rate of the static key modification exceeds a threshold rate. In implementations, when the processing logic detects a code modification, the processing logic may insert the timestamp of the code modification into the code modification list 108 and may subsequently or concurrently delete the earliest timestamp entry in the list if the maximum number of entries in the list has been reached.

In certain implementations, the processing logic may also use code modification timestamps 108 in order to determine whether or not the conditional jump instruction may be reverted to the optimized transfer of control instruction. In this case, the processing logic may determine that the conditional jump instruction may be replaced with the optimized transfer of control instruction if the rate of static key modification based on the code modification timestamps 108 is lower than second threshold rate, thus code optimization may be enabled back since the rate of static key modification is no longer exceeding the first threshold rate.

Optimized branching management component 122 may enable optimized branching of executable instructions using a safe static key. In accordance with one or more aspects of the present disclosure, a jump instruction is initially set to a conditional jump instruction that branches execution to a specific location in code, based on evaluating a conditional expression. When the value of the static key is initialized, the conditional expression may be replaced with an optimized transfer of control instruction, based on the value of the static key. In implementations, the optimized transfer of control instruction may be an unconditional jump instruction to branch execution to a given location in the code. The optimized transfer of control instruction may also be a no operation instruction "no-op" to continue the execution sequence without branching. The rate of change of the static key may be monitored and if it exceeds a certain threshold, the optimized transfer of control instruction may revert back to the conditional jump instruction. Optimized branching management component 122 may include code modification module 124, unconditional jump module 126, conditional jump module 128, static key manager 130, and rate of code modification module 132.

Code modification module 124 may be responsible for performing code modification within a sequence of executable instructions (e.g., within a compiled program) in order to enable optimization, disable optimization, change a target location of an optimized transfer of control instruction, or a combination thereof. In one implementation, when the compiled program is running on a virtual machine, code modification module 124 may replace an optimized transfer of control instruction within the compiled program with a conditional jump instruction. Subsequently, when a safe static key is initialized (e.g., after the boot process of the virtual machine is complete) code modification module 124 may replace the conditional jump instruction with an optimized transfer of control instruction based on the value of the safe static key. Code modification module 124 may further modify the optimized transfer of control instruction based on the value of the safe static key. For example, code modification module 124 may determine that if the safe static key has a value that is greater than zero, then the optimized transfer of control instruction is an unconditional jump instruction to perform a first code path. On the other hand, when the safe static key has a value that is equal to or less than zero, code modification module 124 may update the optimized transfer of control instruction to an unconditional jump instruction to perform a second code path.

Unconditional jump module 126 may be responsible for generating an optimized transfer of control instruction that require code modification to change branching within the program based on the value of the safe static key. For example, if the value of the safe static key exceeds a certain threshold, unconditional jump module 126 may generate an unconditional jump instruction to a given location within the sequence of instructions. The generated unconditional jump instruction may then be inserted in the program by code modification module 124. On the other hand, if the value of the safe static key does not exceed the threshold, unconditional jump module 126 may generate a no operation (e.g., no-op) instruction, indicating that the execution may continue to the next instruction in the sequence without branching. The generated no-op instruction may then be inserted in the program by code modification module 124, replacing the unconditional jump instruction.

Conditional jump module 128 may be responsible for generating un-optimized branching to branch a sequence of execution to a given target location based on an evaluation of a conditional expression. In one implementation, the conditional expression evaluated by conditional jump module 128 may include the safe static key. In other implementations, the conditional expression evaluated by conditional jump module 128 may be independent of the value of the safe static key. Conditional jump module 128 may generate a conditional jump instruction that branches execution to Location A within the program if the conditional expression is satisfied. If the conditional expression is not satisfied, the generated conditional jump instruction may branch execution to Location B within the program. The generated conditional jump instruction may then be inserted in the program by code modification module 124, replacing an optimized transfer of control instruction.

Static key manager 130 may be responsible for creating and updating the value of a safe static key. A safe static key may refer to a conditional expression that enables optimized branching within the program. In one implementation, static key manager 130 may create a safe static key in code as: DEFINE_STATIC_KEY_TRUE (key). In this case, key may be a global variable. In this case, a static key may be created and its value is initialized to TRUE. Optimized static branches can then be executed based on the value of the static key as follows:
   if (static_branch_likely(&key))
      do likely code;
   else
      do unlikely code;
Further, static key manager 130 may be responsible for changing the value of the safe static key (e.g., incremented or decrements) during the operation of the process executing the program. Additionally, static key manager may report to the other module modifications of the static key and the time of static key modifications, so that a rate of static key modifications can be calculated, as explained in more details herein.

Rate of code modification module 132 may be responsible for monitoring and calculating the rate of static key modifications. In an implementation, rate of code modification module 132 may monitor the rate of static key modifications and may replace the optimized transfer of control instruction with a conditional jump instruction when the rate of modifications exceeds a threshold rate. In one implementation, in order to determine the rate of modification of the static key, the rate of code modification module 132 may store a list of timestamps of a last limited number of static key modifications. The rate of code modification module 132 may then determine, based on the list of timestamps, the number of modifications that took place within a given window of time from the current time, and determine if that rate exceeds a specific threshold rate. In implementations, rate of code modification module 132 may execute a background thread to calculate the rate of key modifications periodically and to replace the optimized transfer of control instruction with the conditional jump instruction if the rate of code modifications exceed the threshold. In other implementations, rate of code modification module 132 may calculate the rate of code modifications at the time of inserting a new modification timestamp in the list of code modifications timestamps.

In certain implementations, rate of code modification module 132 may continue to monitor the times of the most recent modifications of the safe static key in order to determine whether or not to replace the conditional jump instruction with the optimized transfer of control instruction, to enable optimization again. In one implementation, rate of code modification module 132 may determine that if the current rate of modification is below a second threshold rate then the conditional jump instruction may be switched back to the optimized transfer of control instruction.

Figure 2:
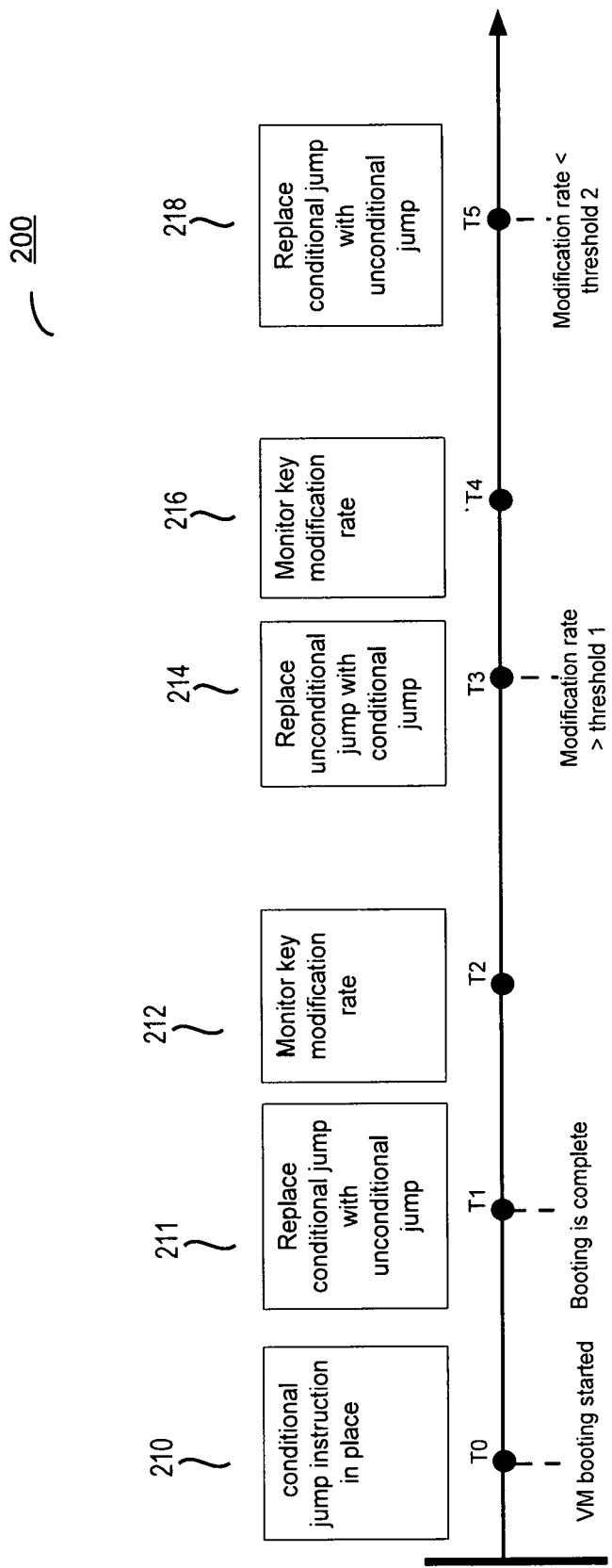
FIG. 2 depicts a sequence diagram illustrating the flow of events for an example method of managing optimized branching using a safe static key, in accordance with one or more aspects of the present disclosure.

FIG. 2 depicts a sequence diagram illustrating the flow of events for an example method 200 of managing optimized branching using a safe static key, in accordance with one or more aspects of the present disclosure. Method 200 may be performed by processing logic that includes hardware (e.g., circuitry, dedicated logic, programmable logic, microcode, etc.), software (e.g., instructions run on a processor to perform hardware simulation), or a combination thereof. Method 200 or each of its individual functions, routines, subroutines, or operations may be performed by one or more processors of a computer system (e.g., the computer system 500 of FIG. 5 or apparatus 700 of FIG. 7) implementing the method. In an illustrative example, method 200 may be performed by a single processing thread. Alternatively, method 200 may be performed by two or more processing threads, each thread implementing one or more individual functions, routines, subroutines, or operations of the method. In an illustrative example, the processing threads implementing method 200 may be synchronized (e.g., using semaphores, critical sections, or other thread synchronization mechanisms).

In an illustrative example, at operation 210 the processing logic at time T0 may detect that a virtual machine (VM) boot process is initiated. The processing logic may then detect that an optimized transfer of control instruction in a sequence of executable instructions is also initialized to a conditional jump instruction. In implementations, the conditional jump instruction may facilitate a speed up of the boot process of the VM because code optimization that may require code modification is not yet enabled in the executable instructions. For example, the conditional jump instruction may be used to branch the execution sequence to a given target location upon satisfaction of a certain condition.

At operation 211, the processing logic at time T1 may detect that the boot process is complete. The processing logic may then determine that s safe static key that is required to enable code optimization has been initialized and that the conditional jump instruction may be replaced with an unconditional jump instruction. In one implementation, the safe static key may be a part of a conditional expression that enables optimized branching either to a location A if the value of the static key satisfies a certain condition, or to a location B if the value of the key does not satisfy the condition, as explained in more details herein. Therefore, at time T1, the processing logic may replace the conditional jump instruction with an unconditional jump instruction that branches the execution to a location A or to a location B, depending on the value of the safe static key.

At operation 212, the processing logic at time T2 may monitor a rate of static key modifications and may replace the unconditional jump instruction with the conditional jump instruction when the rate of key modification exceeds a threshold rate. In an implementation, the processing logic may execute a background thread to calculate the rate of modifications of the safe static key periodically and determine whether or not the rate of modification exceeds the threshold. In this case, the processing logic may store a list of timestamps of the last N numbers of static key modifications. The processing logic may then determine, based on the list of timestamps, the number of code modifications that took place within a given window of time ending at the current time, and determine if that rate exceeds a specific threshold rate (threshold 1).

At operation 214, the processing logic at time T3 may determine that the rate of code modification exceeds threshold 1. In implementations, the processing logic may then determine that a high rate of code modification may be causing performance penalties for the execution environment, the processing logic may then determine to replace the unconditional jump instruction with the conditional jump instruction, thus disabling the code optimization.

At operation 216, the processing logic at time T4, the processing logic may continue to monitor the last N times that modifications to the static key occurred in order to determine when to enable optimization again by replacing the conditional jump instruction with the unconditional jump instruction. In one implementation, the processing logic may determine, based on the list of N timestamps, the number of static key modifications that took place within a window of time ending at the current time, and determine if that rate is below threshold 2. For example, if threshold 2 is 7 and the unit of time is one second, then the processing logic may determine that if less than 7 modifications of the static key took place within the last one second then optimization may be enabled again by replacing the conditional jump instruction with the unconditional jump instruction.

At operation 218, the processing logic at time T5, the processing logic may determine that the rate of static key modifications is less than threshold 2 and may subsequently replace the conditional jump instruction with the unconditional jump instruction to enable code optimization.

Figure 3:
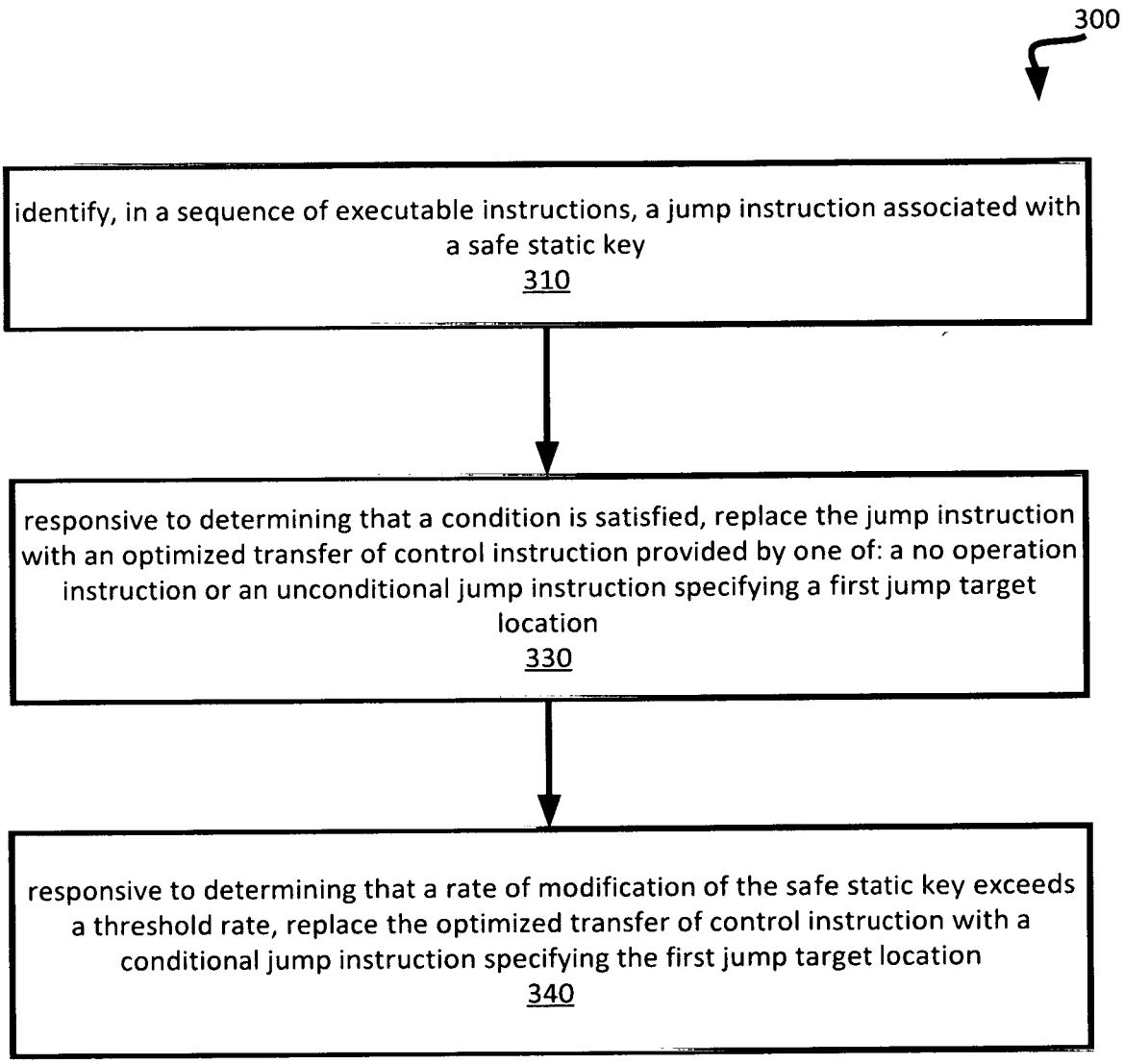
FIG. 3 is a flow diagram of an example method of performing optimized branching using safe static key, in accordance with one or more aspects of the present disclosure.

FIG. 3 is a flow diagram of an example method of performing optimized branching using safe static keys, in accordance with one or more aspects of the present disclosure. Method 300 may be performed by processing logic that includes hardware (e.g., circuitry, dedicated logic, programmable logic, microcode, etc.), software (e.g., instructions run on a processor to perform hardware simulation), or a combination thereof. Method 300 or each of its individual functions, routines, subroutines, or operations may be performed by one or more processors of a computer system (e.g., the computer system 500 of FIG. 5 or apparatus 700 of FIG. 7) implementing the method. In an illustrative example, method 300 may be performed by a single processing thread. Alternatively, method 300 may be performed by two or more processing threads, each thread implementing one or more individual functions, routines, subroutines, or operations of the method. In an illustrative example, the processing threads implementing method 300 may be synchronized (e.g., using semaphores, critical sections, or other thread synchronization mechanisms). Alternatively, the processing threads implementing method 300 may be executed asynchronously with respect to each other. Therefore, while FIG. 3 and the associated description lists the operations of method 300 in certain order, various implementations of the method may perform at least some of the described operations in parallel or in arbitrary selected orders.

Referring to FIG. 3, at block 310, the processing logic may identify in a jump instruction associated with a safe static key in a sequence of executable instructions, a jump instruction associated with a safe static key. In implementations, the sequence of executable instructions may be executed during an execution of a system call by a process running on a virtual machine. In implementations, the jump instruction may be a placeholder instruction that may be replaced with a conditional jump instruction upon the occurrence of certain triggers, as described in more detail herein above. In other implementations, the jump instruction may be a conditional jump instruction specifying a certain jump target location within the code.

At operation 330, responsive to determining that a condition is satisfied, the processing logic may replace the jump instruction with an optimized transfer of control instruction. The optimized transfer of control instruction may be one of a "no operation" instruction, indicating that code execution may continue in the same sequence without branching, or an unconditional jump instruction specifying a specific jump target location for branching. In certain implementations, the condition may be detecting that a boot sequence of the virtual machine executing the sequence of instructions is complete, thus code optimization may be enabled. In other implementations, the condition may be detecting that the safe static key is initialized, for example by periodically checking the value of the safe static key, as explained in more details herein.

At operation 340, when the processing logic determines that the rate of modification of the safe static key exceeds a certain threshold rate, the processing logic may replace the optimized transfer of control instruction with the conditional jump instruction to disable code optimization until the conditions causing the high rate of code modification changes, for example. In implementations, the processing logic may determine the rate of modification of the static key by tracking the number of static key modifications that occurred within a specific window of time, as explained in more details herein.

For simplicity of explanation, the methods of this disclosure are depicted and described as a series of acts. However, acts in accordance with this disclosure may occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media. Each method described herein and/or each of its individual functions, routines, subroutines, or operations may be performed by one or more processing devices of the computer system (e.g., computer system 100 of FIG. 1) implementing the method. In certain implementations, the method may be performed by a single processing thread. Alternatively, the method may be performed by two or more processing threads, each thread executing one or more individual functions, routines, subroutines, or operations of the method. In an illustrative example, the processing threads implementing the method may be synchronized (e.g., using semaphores, critical sections, and/or other thread synchronization mechanisms). Alternatively, the processing threads implementing the method may be executed asynchronously with respect to each other.

Figure 4:
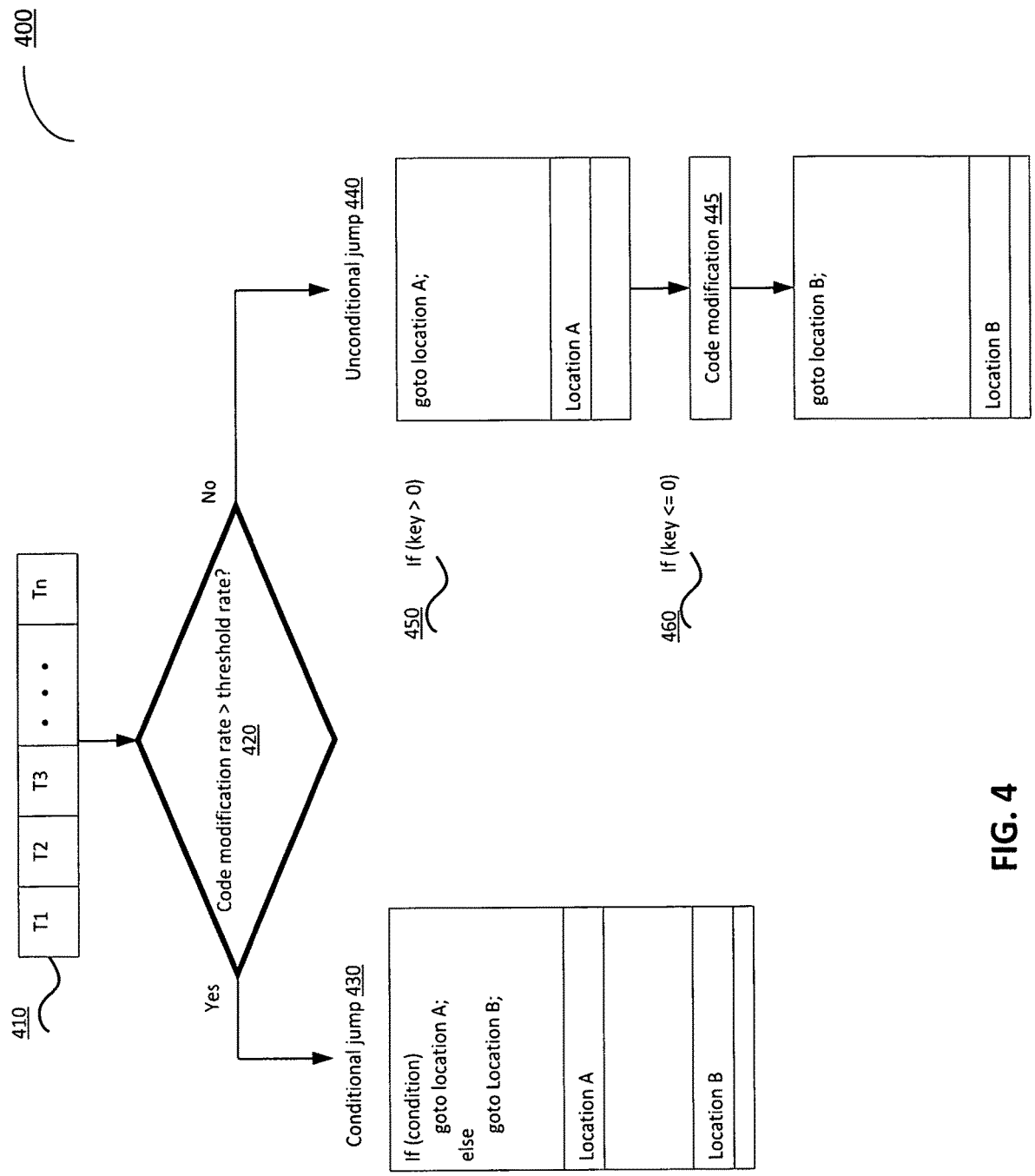
FIG. 4 illustrates an example method for supporting optimized branching using a safe static key, in accordance with one or more aspects of the present disclosure.

FIG. 4 illustrates an example method 400 for supporting optimized branching using a safe static key, in accordance with one or more aspects of the present disclosure. Method 400 may be performed by processing logic that includes hardware (e.g., circuitry, dedicated logic, programmable logic, microcode, etc.), software (e.g., instructions run on a processor to perform hardware simulation), or a combination thereof. Method 400 or each of its individual functions, routines, subroutines, or operations may be performed by one or more processors of a computer system (e.g., the computer system 500 of FIG. 5 or apparatus 700 of FIG. 7) implementing the method. In an illustrative example, method 400 may be performed by a single processing thread. Alternatively, method 400 may be performed by two or more processing threads, each thread implementing one or more individual functions, routines, subroutines, or operations of the method. In an illustrative example, the processing threads implementing method 400 may be synchronized (e.g., using semaphores, critical sections, or other thread synchronization mechanisms). Alternatively, the processing threads implementing method 400 may be executed asynchronously with respect to each other. Therefore, while FIG. 4 and the associated description lists the operations of method 400 in certain order, various implementations of the method may perform at least some of the described operations in parallel or in arbitrary selected orders.

Timestamps list 410 may be a list of timestamps entries T1, T2, T3, and Tn for storing timestamps of code modifications of a safe static key. A safe static key refers to a variable that is included by a conditional expression evaluated at run-time in order to determine the flow of execution of a sequence of executable instructions. The processing logic may add a timestamp of each modification of the static key to timestamp list 410. In implementations, the processing logic may further delete a least recent timestamp entry in timestamp list 410 before adding the new entry in order to keep the number of entries in the list below a certain maximum. The processing logic may then determine, based on timestamp list 410, the rate of code modifications that took place within a given window of time, and determine if that rate exceeds a specific threshold rate.

At operation 420, the processing logic may determine whether the rate of modification of the static key exceeds the threshold rate. If the rate of code modification exceeds the threshold rate, the processing logic may replace the optimized transfer of control instruction with conditional jump instruction 430 to disable code optimization. In implementations. Conditional jump instruction 430 may include a conditional expression that may be evaluated by the processing logic to determine a location for branching execution. For example, conditional jump instruction 430 may branch execution to Location A if the conditional expression is satisfied. If the conditional expression is not satisfied, conditional jump instruction 430 may branch execution to Location B.

If the rate of code modification of static key does not exceed the threshold rate, the processing logic may continue to enable optimization using unconditional jump instruction 440. In implementations, processing logic, at operation 450, may determine that if the value of the safe static key is >0 then the unconditional jump instruction 440 may branch execution to location A within the code. In this case, the evaluation of the condition involving the key happens by the processing logic and not by the unconditional jump instruction itself.

At operation 460, the processing logic may evaluate the value of the static key again. If the value of the static key is less than zero, the processing logic may determine that the unconditional jump instruction of "goto Location A;" may be replaced with the unconditional jump instruction of "goto Location B;", in order to branch code to location B instead of location A, due to the change in the static key value. The processing logic may then perform code modification at 445 to replace instruction "goto Location A;" with instruction "goto Location B;".

Figure 5:
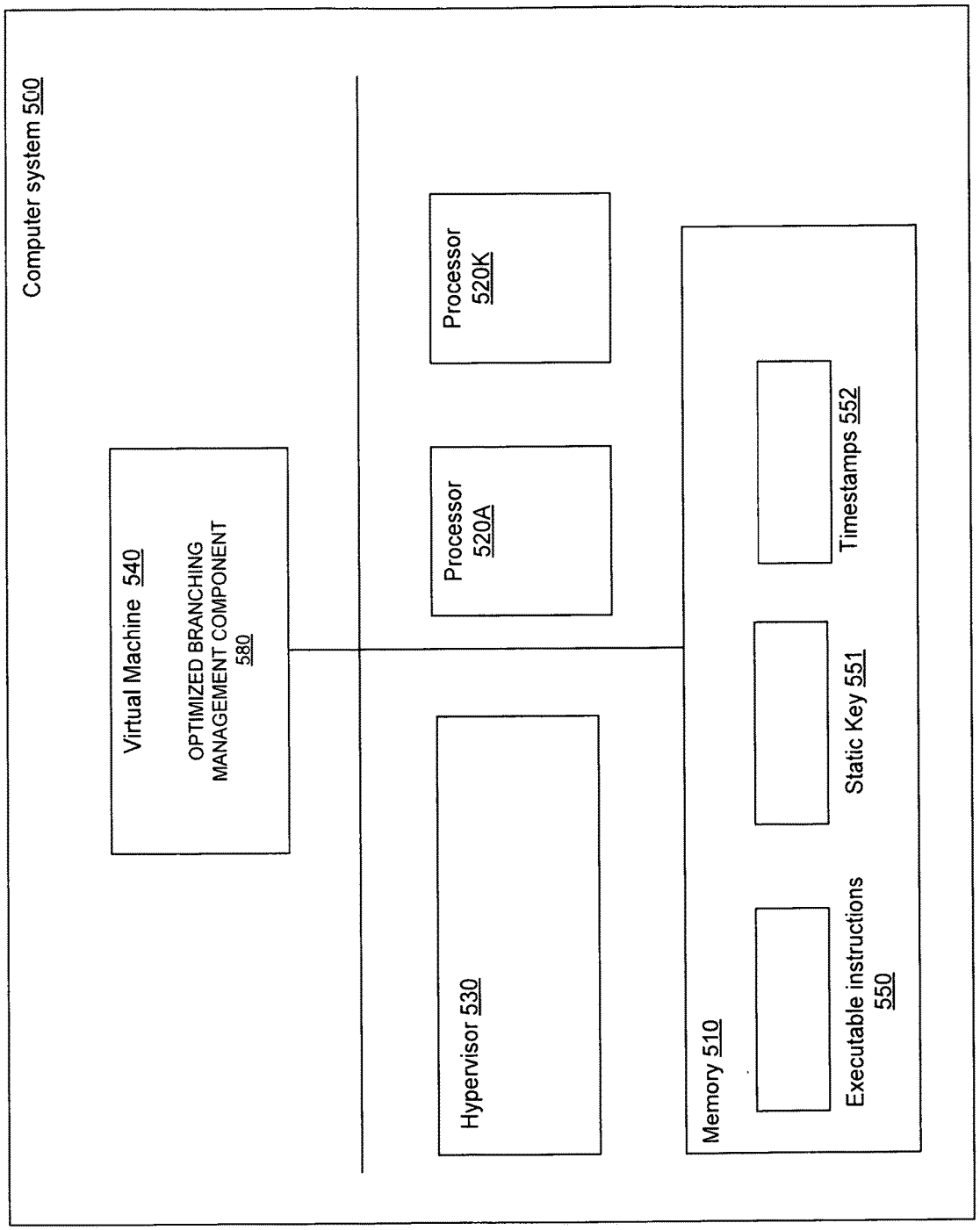
FIG. 5 depicts a block diagram of an illustrative computer system operating in accordance with one or more aspects of the disclosure.

FIG. 5 depicts a block diagram of an illustrative computer system 500 operating in accordance with one or more aspects of the disclosure. In various illustrative examples, computer system 500 may be represented by computer system 100 of FIG. 1. Computer system 500 comprises a memory 510 and one or more physical processors 520A-520N, that are operatively coupled to the memory 510 and executes code implementing hypervisor 530 and processing thread implementing virtual machines 540 managed by hypervisor 530. The memory may store timestamps 552 to track code modification times, static key 551 to enable an optimized transfer of control instruction, and executable instructions 550 that include an optimized transfer of control instruction. Virtual machine 540 may include an optimized branching management component 580 operating in accordance with one or more aspects of the present disclosure. In an illustrative example, optimized branching management component 580 may implement methods 200, 300, 400 and/or 600 of FIGS. 2, 3, 4, and 6.

Figure 6:
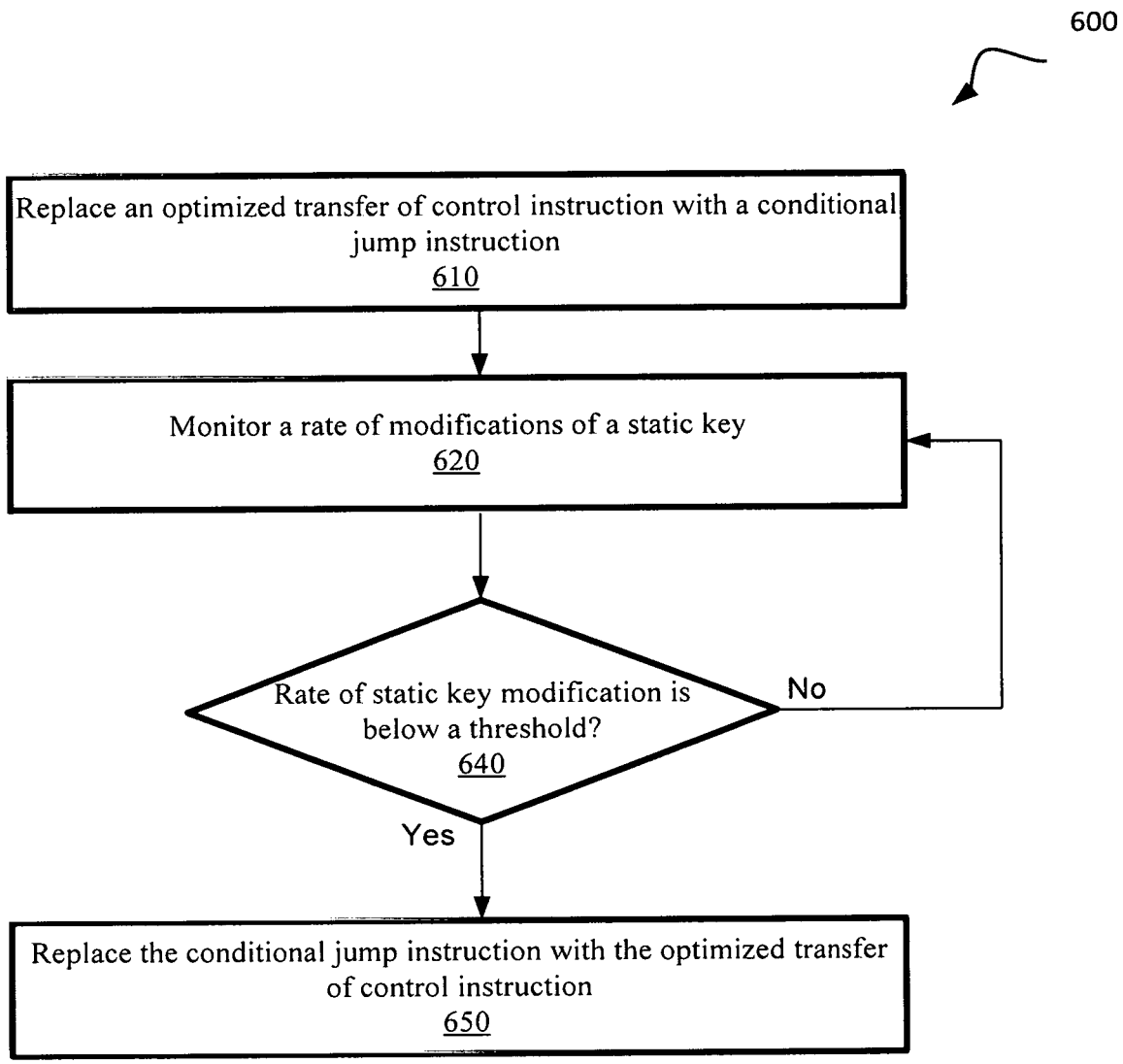
FIG. 6 is a flow diagram of an example method of performing optimized branching based on modifications of a safe static key, in accordance with one or more aspects of the present disclosure.

FIG. 6 is a flow diagram of an example method of performing optimized branching based on modifications of a safe static key, in accordance with one or more aspects of the present disclosure. Method 600 may be performed by processing logic that includes hardware (e.g., circuitry, dedicated logic, programmable logic, microcode, etc.), software (e.g., instructions run on a processor to perform hardware simulation), or a combination thereof. Method 600 or each of its individual functions, routines, subroutines, or operations may be performed by one or more processors of a computer system (e.g., the computer system 500 of FIG. 5 or apparatus 700 of FIG. 7) implementing the method. In an illustrative example, method 600 may be performed by a single processing thread. Alternatively, method 600 may be performed by two or more processing threads, each thread implementing one or more individual functions, routines, subroutines, or operations of the method. In an illustrative example, the processing threads implementing method 600 may be synchronized (e.g., using semaphores, critical sections, or other thread synchronization mechanisms). Alternatively, the processing threads implementing method 600 may be executed asynchronously with respect to each other. Therefore, while FIG. 6 and the associated description lists the operations of method 600 in certain order, various implementations of the method may perform at least some of the described operations in parallel or in arbitrary selected orders.

At block 610, the processing logic may replace an optimized transfer of control instruction with a conditional jump instruction. In implementations, the processing logic may determine to disable optimization by replacing the optimized transfer of control instruction with a conditional jump instruction due to a high rate of static key modifications, as explained in more details herein.

At operation 620, the processing logic may monitor a rate of modifications to the static key and determine if rate of modifications is below a certain threshold. In implementations, the processing logic may determine that if the rate of code modifications to the static key is below the threshold then code optimization may be enabled again because conditions causing frequent code modifications may no longer exist. In an illustrative example, the processing logic may track the times of the most recent modifications of the safe static key in order to calculate the rate of static key modifications.

At operation 640, the processing logic may compare the rate of static key modification with the threshold. In implementations, the processing logic may store a list of timestamps of a last N number of static key modifications. The rate of static key modifications may then be determine, based on the list of timestamps, as the number of key modifications that took place within a given window of time ending at the current time. If the rate of code modifications is above the threshold, the processing logic may continue to monitor the rate of static key modifications at operation 620 without enabling optimization.

At operation 650, in response to determining that the rate of static key modifications is below the threshold, the processing logic may replace the conditional jump instruction with the optimized transfer of control instruction, to enable optimization again. In implementations, the processing logic may continue to monitor modifications rate of the static key to enable and disable code optimization accordingly, as explained in more details herein above.

Figure 7:
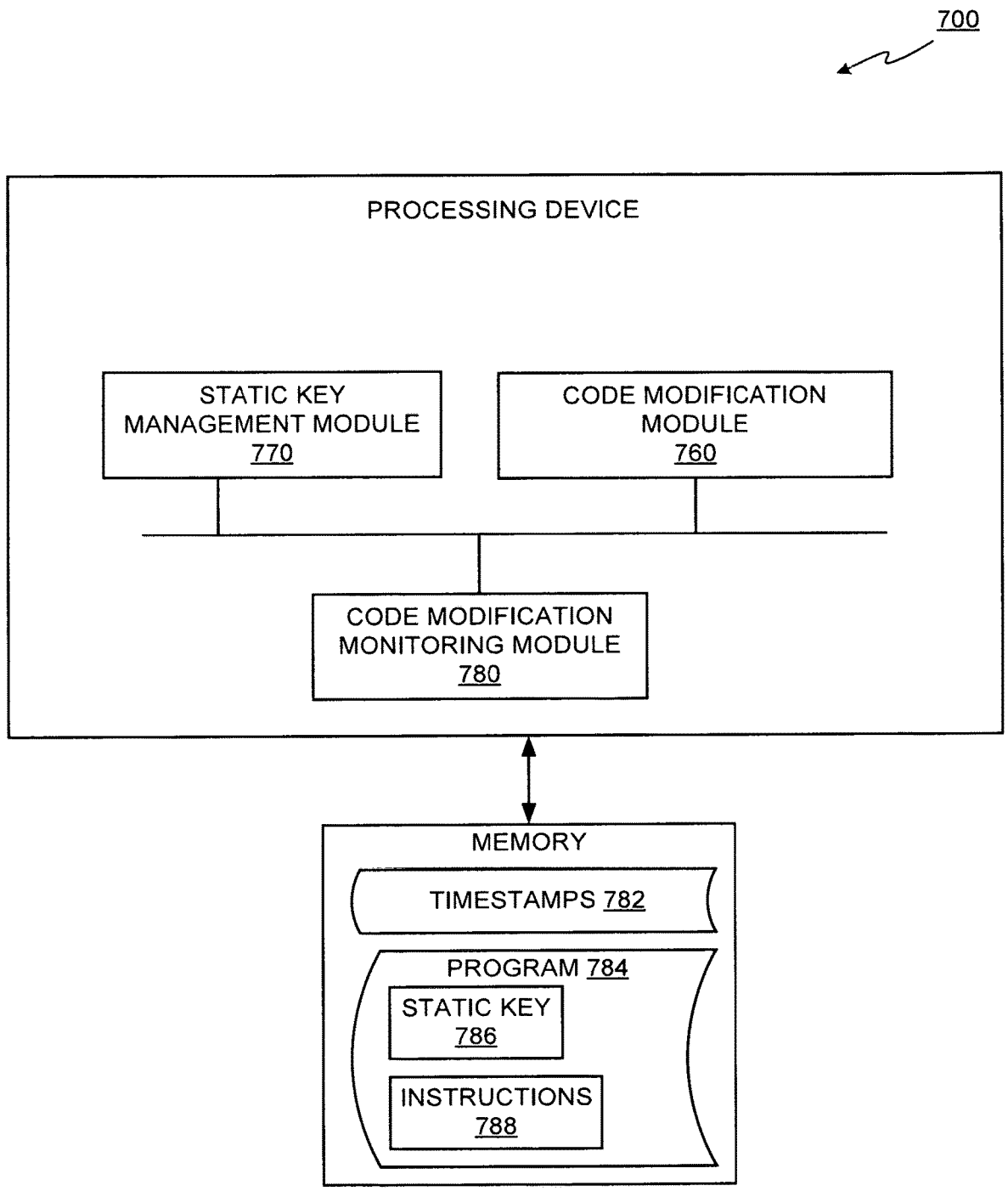
FIG. 7 depicts a block diagram of an example apparatus in accordance with one or more aspects of the present disclosure.

FIG. 7 depicts a block diagram of an example apparatus 700 in accordance with one or more aspects of the present disclosure. Apparatus 700 may include one or more processing devices and one or more memory devices. In the example shown, apparatus 700 may include a code modification module 760, a static key management module 770, and a code modification monitoring module 780. Code modification module 760 may be where modifications to an optimized transfer of control instruction occur as well as replacement of the optimized transfer of control instruction with a conditional jump instruction occurs. Static key management module 770 may be where initialization and updates to a safe static key that enables the optimized transfer of control instruction occurs. Code modification monitoring module 780 may be where a rate of code modifications to the safe static key is calculated and stored.

Code modification module 760 may enable processing device to perform code modification within a sequence of executable instructions within compiled program 784 in order to enable optimization, disable optimization, change a target location of an optimized transfer of control instruction, or a combination thereof. In one implementation, when program 784 is running on a virtual machine, code modification module 760 may replace a jump instruction within the sequence of instructions 788 with a conditional jump instruction. Subsequently, when static key 786 is initialized (e.g., after the boot process of the virtual machine is complete) code modification module 760 may replace the conditional jump instruction with an optimized transfer of control instruction based on the value of static key 786. Code modification module 760 may further modify the optimized transfer of control instruction based on the value of static key 786. For example, code modification module 760 may determine that if static key 786 has a value that is greater than zero, then the optimized transfer of control instruction is an unconditional jump instruction to branch execution to location A within instructions 788. On the other hand, when static key 786 has a value that is equal to or less than zero, code modification module 760 may update the optimized transfer of control instruction to an unconditional jump instruction to branch execution to location B within instructions 788.

Static key management module 770 may be enable the processing device to create and update the value of safe static key 786. Safe static key 786 may refer to a conditional expression that enables optimized branching within program 784. In one implementation, static key management module 770 may create safe static key 786 in memory as a global variable. Safe static key 786 may be created and its value may be initialized to zero. The value of safe static key 786 may then be incremented or decremented during the execution of program 784. Further, static key management module 770 may be responsible for tracking changes to the value of safe static key 786 and may report to the other modules modifications of static key 784 and the time of each modification, so that a rate of static key modifications can be calculated, as explained in more details herein.

Code modification monitoring module 780 may be responsible for tracking and handling the rate of code modification of the safe static key 786. In an implementation, code modification monitoring module 780 may monitor the rate of code modifications and may replace the optimized transfer of control instruction with a conditional jump instruction when the rate of code modification exceeds a threshold rate. In one implementation, in order to determine the rate of modification of the static key 786, the code modification monitoring module 780 may store a list of timestamps of a last limited number of static key modifications. The code modification monitoring module 780 may then determine, based on the list of timestamps, the number of code modifications that took place within a given window of time, and determine if that rate exceeds a specific threshold rate, as explained in more details herein above. In implementations, code modification monitoring module 780 may execute a background thread to calculate the rate of code modifications periodically and to replace the optimized transfer of control instruction with the conditional jump instruction if the rate of code modifications exceeds the threshold. In other implementations, code modification monitoring module 780 may calculate the rate of code modifications at the time of inserting a new modification timestamp in the list of code modifications timestamps.

Figure 8:
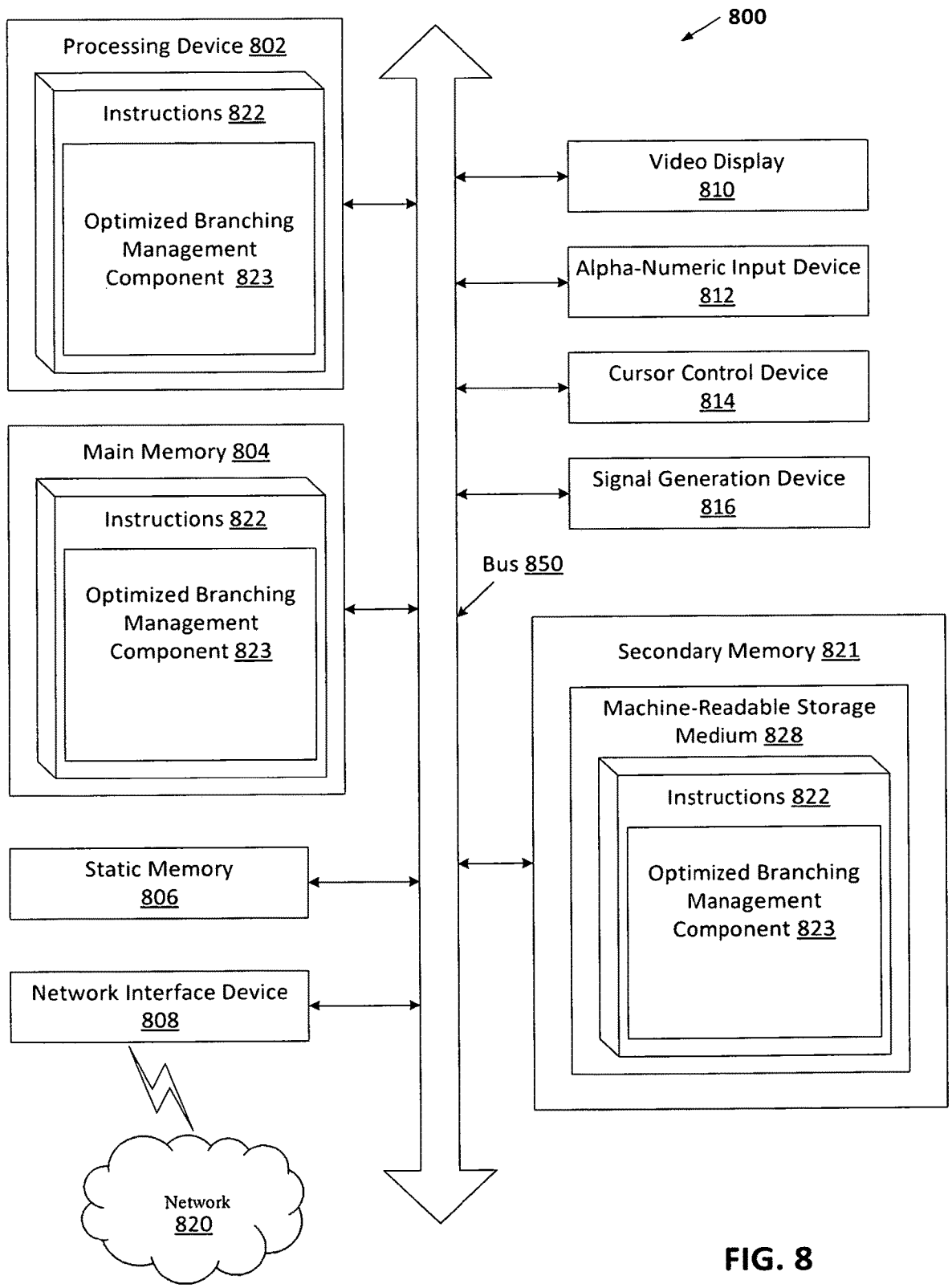
FIG. 8 illustrates a diagrammatic representation of a machine in the exemplary form of a computer system, in accordance with one or more aspects of the present disclosure.

FIG. 8 illustrates a diagrammatic representation of a machine in the exemplary form of a computer system 800 within which a set of instructions, for causing the machine to perform any one or more of the methodologies discussed herein, may be executed. The computer system 800 may correspond to computer system 100 of FIG. 1. In embodiments of the present invention, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 800 includes a processing device 802, a main memory 804 (e.g., read-only memory (ROM), flash memory, dynamic random access memory (DRAM) such as synchronous DRAM (SDRAM) or Rambus DRAM (RDRAM), etc.), a static memory 806 (e.g., flash memory, static random access memory (SRAM), etc.), and a secondary memory 816 (e.g., a data storage device), which communicate with each other via a bus 850.

The processing device 802 represents one or more general-purpose processors such as a microprocessor, central processing unit, or the like. The term "processing device" is used herein to refer to any combination of one or more integrated circuits and/or packages that include one or more processors (e.g., one or more processor cores). Therefore, the term processing device encompasses a single core CPU, a multi-core CPU and a massively multi-core system that includes many interconnected integrated circuits, each of which may include multiple processor cores. The processing device 802 may therefore include multiple processors. The processing device 802 may include a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 802 may also be one or more special-purpose processing devices such as an application specific integrated circuit (ASIC), a field programmable gate array (FPGA), a digital signal processor (DSP), network processor, or the like.

The computer system 800 may further include a network interface device 808. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 816 (e.g., a speaker).

The secondary memory 821 may include a machine-readable storage medium (or more specifically a computer-readable storage medium) 828 on which is stored one or more sets of instructions 822 embodying any one or more of the methodologies or functions described herein (e.g., optimized branching management component 823). The instructions 822 may also reside, completely or at least partially, within the main memory 804 and/or within the processing device 802 during execution thereof by the computer system 800; the main memory 804 and the processing device 802 also constituting machine-readable storage media.

While computer-readable storage medium 828 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by component modules or functional circuitry within hardware devices. Further, the methods, components, and features may be implemented in any combination of hardware devices and computer program components, or in computer programs.

Unless specifically stated otherwise, terms such as "reading," "setting," "detecting," "obtaining," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 300-400 of FIGS. 3-4 and/or each of their individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

Other computer system designs and configurations may also be suitable to implement the systems and methods described herein. The following examples illustrate various implementations in accordance with one or more aspects of the present disclosure.

Example 1 is a method comprising: identifying, in a sequence of executable instructions, a jump instruction associated with a safe static key; responsive to determining that a condition is satisfied, replacing the jump instruction with an optimized transfer of control instruction provided by one of: a no operation instruction or an unconditional jump instruction specifying a first jump target location; responsive to determining that a rate of modification of the safe static key exceeds a threshold rate, replacing the optimized transfer of control instruction with a conditional jump instruction specifying the first jump target location.

Example 2 is a method of Example 1, wherein the safe static key is a part of a conditional expression associated with the jump instruction.

Example 3 is a method of Example 1, wherein the sequence of executable instructions is executed by a process running on a virtual machine.

Example 4 is a method of Example 1, wherein the jump instruction is a conditional jump instruction.

Example 5 is a method of Example 1, wherein determining that the rate of modification of the optimized transfer of control instruction exceeds the threshold rate further comprises: detecting that the optimized transfer of control instruction is modified; adding a timestamp of a current time to a list of code modification timestamps; and determining the rate of modification of the optimized transfer of control instruction as a number of entries in the list of code modification timestamps that fall within a predetermined window.

Example 6 is a method of Example 5 further comprising: responsive to adding the timestamp of the current time to the list of code modification timestamps, deleting an earliest timestamp from the list of code modification timestamps.

Example 7 is a method of Example 1, wherein replacing the conditional jump instruction with the optimized transfer of control instruction is in view of a current value of the safe static key.

Example 8 is a method of Example 1 further comprising: responsive to determining that the rate of modification of the optimized transfer of control instruction satisfies a second threshold rate, replacing the conditional jump instruction with the optimized jump instruction, wherein the second threshold rate is a lower rate than the threshold rate.

Example 9 is a method of Example 1 further comprises: responsive to determining that a second condition is satisfied, replacing the jump instruction with the conditional jump instruction, wherein the second condition comprises detecting a boot sequence of a virtual machine executing the sequence of instructions.

Example 10 is a method of Example 1, wherein the second condition further comprises at least one of: detecting that a boot sequence of a virtual machine executing the sequence of instructions is complete or detecting that the safe static key is initialized.

Example 11 is a system comprising: a memory; and a processing device operatively coupled to the memory, wherein the processing device is further to: detect that a boot process for a virtual machine running is initiated; identify, in a sequence of executable instructions to be executed by the virtual machine, a jump instruction associated with a safe static key; responsive to initiating the boot process, replace the jump instruction with a conditional jump instruction; and responsive to detecting a completion of the boot process, replace the conditional jump instruction with an unconditional jump instruction based on a value of the safe static key.

Example 12 is a system of Example 11, wherein the processing device is further to: responsive to determining that a rate of modification of the unconditional jump instruction exceeds a threshold rate, replace the unconditional jump instruction with the conditional jump instruction.

Example 13 is a system of Example 12, wherein to determine that the rate of modification of the unconditional jump instruction exceeds the threshold rate, the processing device is further to: detect that the unconditional jump instruction is modified; add a timestamp of a current time to a list of code modification timestamps; and determine the rate of modification of the unconditional jump instruction as a number of entries in the list of code modification timestamps that fall within a unit of time.

Example 14 is a system of Example 11, wherein the safe static key is a part of a conditional expression enabling the unconditional jump instruction.

Example 15 is a system of Example 11, wherein the sequence of executable instructions comprise a compiled program running on the virtual machine.

Example 16 is a non-transitory computer-readable storage medium comprising executable instructions that, when executed by a processing device, cause the processing device to: identify, in a sequence of executable instructions, a jump instruction associated with a safe static key; responsive to determining that a first condition is satisfied, replace the jump instruction with a conditional jump instruction specifying a first jump target location; responsive to determining that a second condition is satisfied, replace the conditional jump instruction with an optimized transfer of control instruction provided by one of: a no operation instruction or an unconditional jump instruction specifying the first jump target location; responsive to determining that a rate of modification of the safe static key exceeds a threshold rate, replacing the optimized transfer of control instruction with the conditional jump instruction.

Example 17 is a non-transitory computer-readable storage medium of Example 16, wherein to determine that the rate of modification of the safe static key exceeds the threshold rate, the processing device is further to: detect that the safe static key is modified; add a timestamp of a current time to a list of code modification timestamps; and determine the rate of modification of the safe static key as a number of entries in the list of code modification timestamps that fall within a unit of time.

Example 18 is a non-transitory computer-readable storage medium of Example 16, wherein the processing device is further to: responsive to determining that the rate of modification of the safe static key satisfies a second threshold rate, replace the conditional jump instruction with the optimized jump instruction, wherein the second threshold rate is a lower rate than the threshold rate.

Example 19 is a non-transitory computer-readable storage medium of Example 16, wherein the first condition further comprises detecting a boot sequence of a virtual machine executing the sequence of instructions.

Example 20 is a non-transitory computer-readable storage medium of Example 16, wherein the second condition further comprises at least one of: detecting that a boot sequence of a virtual machine executing the sequence of instructions is complete or detecting that the safe static key is initialized.

Example 21 is an electronic device, comprising: a memory; and a processing device operatively coupled to the memory, wherein the processing device is further to: identify, in a sequence of executable instructions, a jump instruction associated with a safe static key; responsive to determining that a first condition is satisfied, replace the jump instruction with a conditional jump instruction specifying a first jump target location; responsive to determining that a second condition is satisfied, replace the conditional jump instruction with an optimized transfer of control instruction provided by one of: a no operation instruction or an unconditional jump instruction specifying the first jump target location; responsive to determining that a rate of modification of the safe static key exceeds a threshold rate, replace the optimized transfer of control instruction with the conditional jump instruction.

Example 22 is an electronic device of Example 21, wherein the safe static key is a part of a conditional expression associated with the conditional jump instruction.

Example 23 is an electronic device of Example 21, wherein the sequence of executable instructions is executed by a process running on a virtual machine.

Example 24 is an electronic device of Example 21, wherein the processing device is further to: receive, by a process running on the virtual machine, a request to execute a system call, wherein executing the system call comprises executing the sequence of executable instructions.

Example 25 is an electronic device of Example 21, wherein to determine that the rate of modification of the optimized transfer of control instruction exceeds the threshold rate, the processing device is further to: detect that the optimized transfer of control instruction is modified; add a timestamp of a current time to a list of code modification timestamps; and determine the rate of modification of the optimized transfer of control instruction as a number of entries in the list of code modification timestamps that fall within a predetermined window.

Example 26 is an electronic device of Example 25, wherein the processing device is further to: responsive to adding the timestamp of the current time to the list of code modification timestamps, delete an earliest timestamp from the list of code modification timestamps.

Example 27 is an electronic device of Example 21, wherein replacing the conditional jump instruction with the optimized transfer of control instruction is in view of a current value of the safe static key.

Example 28 is an electronic device of Example 21, wherein the first condition further comprises detecting a boot sequence of a virtual machine executing the sequence of instructions.

Example 29 is an electronic device of Example 21, wherein the second condition further comprises at least one of: detecting that a boot sequence of a virtual machine executing the sequence of instructions is complete or detecting that the safe static key is initialized.

Example 30 is an apparatus comprising: a means to detect that a boot process for a virtual machine running is initiated; a means to identify, in a sequence of executable instructions to be executed by the virtual machine, a jump instruction associated with a safe static key; responsive to initiating the boot process, a means to replace the jump instruction with a conditional jump instruction; and responsive to detecting a completion of the boot process, a means to replace the conditional jump instruction with an unconditional jump instruction based on a value of the safe static key.

Example 31 is an apparatus of Example 30 further comprising: responsive to determining that a rate of modification of the unconditional jump instruction exceeds a threshold rate, a means to replace the unconditional jump instruction with the conditional jump instruction.

Example 32 is an apparatus of Example 30, wherein the means to determine that the rate of modification of the unconditional jump instruction exceeds the threshold rate further comprises: a means to detect that the unconditional jump instruction is modified; a means to add a timestamp of a current time to a list of code modification timestamps; and a means to determine the rate of modification of the unconditional jump instruction as a number of entries in the list of code modification timestamps that fall within a unit of time.

Example 33 is an apparatus of Example 30, wherein the safe static key is a part of a conditional expression enabling the unconditional jump instruction.

Example 34 is an apparatus of Example 30, wherein the sequence of executable instructions comprise a compiled program running on the virtual machine.

What is claimed is:

1. A method comprising:
   identifying, in a sequence of executable instructions, a jump instruction associated with a safe static key;
   responsive to determining that a condition is satisfied, replacing the jump instruction with an optimized transfer of control instruction provided by one of: a no operation instruction or an unconditional jump instruction specifying a first jump target location; and
   responsive to determining that a rate of modification of the safe static key exceeds a threshold rate, replacing the optimized transfer of control instruction with a conditional jump instruction specifying the first jump target location.

2. The method of claim 1, wherein the safe static key is a part of a conditional expression associated with the jump instruction.

3. The method of claim 1, wherein the sequence of executable instructions is executed by a process running on a virtual machine.

4. The method of claim 1, wherein the jump instruction is a conditional jump instruction.

5. The method of claim 1 further comprises:
   responsive to determining that a second condition is satisfied, replacing the jump instruction with the conditional jump instruction, wherein the second condition comprises detecting a boot sequence of a virtual machine executing the sequence of instructions.

6. The method of claim 1, wherein determining that the rate of modification of the optimized transfer of control instruction exceeds the threshold rate further comprises:
   detecting that the optimized transfer of control instruction is modified;
   adding a timestamp of a current time to a list of code modification timestamps; and
   determining the rate of modification of the optimized transfer of control instruction as a number of entries in the list of code modification timestamps that fall within a predetermined window.

7. The method of claim 6 further comprising:
   responsive to adding the timestamp of the current time to the list of code modification timestamps, deleting an earliest timestamp from the list of code modification timestamps.

8. The method of claim 1, wherein replacing the jump instruction with the optimized transfer of control instruction is in view of a current value of the safe static key.

9. The method of claim 1 further comprising:
   responsive to determining that the rate of modification of the safe static key satisfies a second threshold rate, replacing the conditional jump instruction with the unconditional jump instruction, wherein the second threshold rate is a lower rate than the threshold rate.

10. The method of claim 1, wherein the condition further comprises at least one of: detecting that a boot sequence of a virtual machine executing the sequence of instructions is complete or detecting that the safe static key is initialized.

11. A system comprising:
a memory; and
a processing device operatively coupled to the memory, wherein the processing device is further to:
detect that a boot process for a running virtual machine is initiated;
identify, in a sequence of executable instructions to be executed by the virtual machine, a jump instruction associated with a safe static key;
responsive to initiating the boot process, replace the jump instruction with a conditional jump instruction; and
responsive to detecting a completion of the boot process, replace the conditional jump instruction with an unconditional jump instruction based on a value of the safe static key.

12. The system of claim 11, wherein the processing device is further to:
responsive to determining that a rate of modification of the unconditional jump instruction exceeds a threshold rate, replace the unconditional jump instruction with the conditional jump instruction.

13. The system of claim 12, wherein to determine that the rate of modification of the unconditional jump instruction exceeds the threshold rate, the processing device is further to:
detect that the unconditional jump instruction is modified;
add a timestamp of a current time to a list of code modification timestamps; and
determine the rate of modification of the unconditional jump instruction as a number of entries in the list of code modification timestamps that fall within a unit of time.

14. The system of claim 11, wherein the safe static key is a part of a conditional expression enabling the unconditional jump instruction.

15. The system of claim 11, wherein the sequence of executable instructions comprise a compiled program running on the virtual machine.

16. A non-transitory computer-readable storage medium comprising executable instructions that, when executed by a processing device, cause the processing device to:
identify, in a sequence of executable instructions, a jump instruction associated with a safe static key;
responsive to determining that a first condition is satisfied, replace the jump instruction with a conditional jump instruction specifying a first jump target location;
responsive to determining that a second condition is satisfied, replace the conditional jump instruction with an optimized transfer of control instruction provided by one of: a no operation instruction or an unconditional jump instruction specifying the first jump target location; and
responsive to determining that a rate of modification of the safe static key exceeds a threshold rate, replacing the optimized transfer of control instruction with the conditional jump instruction.

17. The non-transitory computer-readable storage medium of claim 16, wherein to determine that the rate of modification of the safe static key exceeds the threshold rate, the processing device is further to:
detect that the safe static key is modified;
add a timestamp of a current time to a list of code modification timestamps; and
determine the rate of modification of the safe static key as a number of entries in the list of code modification timestamps that fall within a unit of time.

18. The non-transitory computer-readable storage medium of claim 16, wherein the processing device is further to:
responsive to determining that the rate of modification of the safe static key satisfies a second threshold rate, replace the conditional jump instruction with the unconditional jump instruction, wherein the second threshold rate is a lower rate than the threshold rate.

19. The non-transitory computer-readable storage medium of claim 16, wherein the first condition further comprises detecting a boot sequence of a virtual machine executing the sequence of instructions.

20. The non-transitory computer-readable storage medium of claim 16, wherein the second condition further comprises at least one of: detecting that a boot sequence of a virtual machine executing the sequence of instructions is complete or detecting that the safe static key is initialized.

* * * * *